(No Model.)
O. H. & W. T. KING.
HORSE HAY RAKE.
No. 348,750. Patented Sept. 7, 1886.
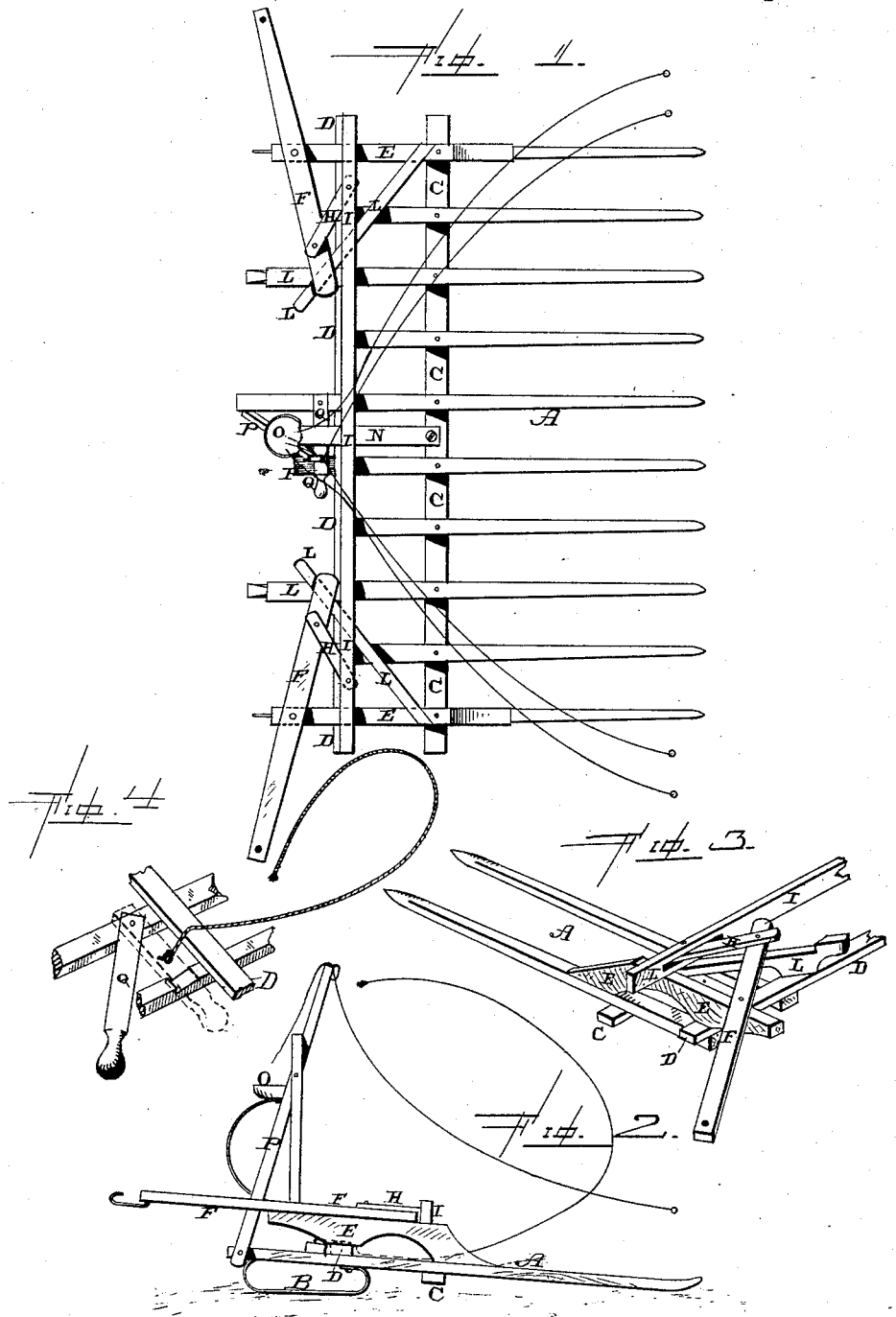
Witnesses.
L. F. Gardner
A. S. Pattison
Inventors.
O. H. King,
W. T. King,
per F. A. Lehmann, Atty

UNITED STATES PATENT OFFICE.

OBED H. KING AND WILLIAM T. KING, OF HOUGHTON, IOWA.

HORSE HAY-RAKE.

SPECIFICATION forming part of Letters Patent No. 348,750, dated September 7, 1886.

Application filed December 16, 1885. Serial No. 185,811. (No model.)

*To all whom it may concern:*

Be it known that we, OBED H. KING and WILLIAM T. KING, of Houghton, in the county of Lee and State of Iowa, have invented certain new and useful Improvements in Horse Hay-Rakes; and we do hereby declare the following to be a full, clear, and exact description of the invention, such as will enable others skilled in the art to which it pertains to make and use it, reference being had to the accompanying drawings, which form a part of this specification.

Our invention relates to an improvement in hay-rakes; and it consists in, first, the combination of the hay-rake, the lever-supports placed upon the rear corners thereof, the levers pivoted upon the rear ends of the supports, the batten which moves upon the top of the rake, and the stops for the levers; second, the combination of the rake with a rope-holder, which is pivoted at one end upon the extended rear end of the rake-tooth, and which has its other end to rest in a notch in the extended end of another tooth, there being a slot or opening between the rear rake-stringer and the rope-holder large enough to receive the rope, but not to let the knot on the end of the rope pass through, for the purpose of connecting the drive-rope of the hay-stacker to the rake, thereby enabling the team that draws the rake to drive the hay-stacker, as will be more fully described hereinafter.

Figure 1 is a plan view of a rake embodying our invention. Fig. 2 is a side elevation of the same, showing the levers in the position they assume after the horses reverse their motion. Fig. 3 is a perspective. Fig. 4 is a detail view of the rope-holder.

A represents the hay-rake, which is supported at its rear end upon the runners B, which are secured to the under sides of the rear extended ends of two of the rake-teeth. The front ends of the teeth rest upon the ground in the usual manner.

Secured to the under side of the teeth is stringer C, which is placed a considerable distance in advance of the rear one, D, which is secured upon the top of the rear ends of the rake-teeth. This stringer C braces the rake-teeth rigidly together at a point sufficiently far forward to allow the lever-supports E to be secured upon the tops of the two end teeth. These supports E project backward beyond the rear end of the rake sufficiently far to allow the operating-levers F to be pivoted thereon in the rear of the rear stringer, D. By placing this front stringer on the under side of the rake-teeth in advance of the rear one, in the manner here shown, the rake can be filled back to the rear stringer, and thus a considerable space is gained upon the teeth as compared with rakes in which the front stringer is placed on top of the teeth in the usual manner. The levers are pivoted near their centers, and their inner ends are pivoted or loosely connected to the short connecting-rods H. The front ends of the rods H are pivoted to the batten I, by means of which the load of hay is forced forward upon the teeth when the motion of the horses is reversed. The horses are hitched to the outer ends of the levers, and when the rake is being drawn forward, for the purpose of gathering the hay, the horses are turned in the direction of the front ends of the teeth; but when it is desired to unload the rake the motion of the horses is reversed, and then the levers are turned upon their pivots so as to extend in a line with the rake-teeth, thus causing their inner ends to turn forward and force the batten, together with the load, forward toward the front ends of the teeth. The load of hay being thus started from off the teeth, the rake can be pulled from under it by the movement of the horses, thus leaving the whole load upon the ground or pitcher-teeth, as desired.

In order to regulate the distance, the inner ends of these levers shall be moved backward, suitable shoulders or stops are formed upon the braces L, which extend diagonally backward from the lever-supports across the rear stringer, and these braces serve both to brace and strengthen the rake at its corners and to regulate the distance the batten shall be moved. When the animals reverse their forward motion, the levers turn upon their pivots, and the batten is forced forward into the position shown in Fig. 2.

Secured upon the tops of the stringers is the seat-support N, upon the rear end of which seat O, is placed. The rake-tooth to the left of this support has its rear ends extended a suitable distance beyond the rear end of the seat-support, and secured to this extended end of the tooth and to the side of the seat-support is a line-staff, P, which projects forward and upward beyond the seat, and is provided at its front end with a line-holder for the purpose of holding the two inside lines, while the two outside ones are held by the driver. This staff has a suitable brace secured to it for the purpose of bracing it in position.

Pivoted upon the extended end of the rake-tooth to which the line-staff is secured, and at a suitable distance in the rear of the rear stringer, is pivoted the rope-holder or lever Q. This holder or lever extends across the top of the next adjoining tooth, as shown, and fits in a notch which is formed in its top. Between the front edge of this holder or lever and the rear edge of the rear stringer is left an opening or slot just large enough to receive the rope, but not to let the knot on the end of the rope pass through. By means of this construction the drive-rope of the hay-stacker can be fastened to the rake, thereby enabling the team that draws the rake to drive the hay-pitcher.

Having thus described our invention, we claim—

1. The combination of the two extended teeth of the rake, one of which is provided with a notch or catch, the stringer D, which extends across the teeth, and the lever Q, pivoted upon one of the extended teeth in the rear of the stringer and which is adapted to catch in the notch in the other extended tooth, substantially as shown.

2. The combination of the hay-rake, the lever-supports placed upon the rear corners thereof, the levers pivoted upon the rear ends of the supports, the batten which moves upon the top of the rake, and the stops for the ends of the levers F to strike against, substantially as specified.

In testimony whereof we affix our signatures in presence of two witnesses.

OBED H. KING.
WILLIAM T. KING.

Witnesses:
E. H. PEASE,
IRA MACKEY.